(12) United States Patent
Jeon (10) Patent No.: US 7,911,363 B2
(45) Date of Patent: Mar. 22, 2011

(54) APPARATUS AND METHOD FOR INPUTTING CHARACTERS IN PORTABLE ELECTRONIC EQUIPMENT

(75) Inventor: Hyun Min Jeon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1142 days.

(21) Appl. No.: 11/607,987

(22) Filed: Dec. 4, 2006

(65) Prior Publication Data
US 2007/0171097 A1    Jul. 26, 2007

(30) Foreign Application Priority Data

Jan. 11, 2006   (KR) .................. 10-2006-0003203

(51) Int. Cl.
*H03M 11/00* (2006.01)
(52) U.S. Cl. ............ 341/22; 341/20; 345/168; 708/142; 708/146
(58) Field of Classification Search .............. 341/20, 341/22; 345/168; 708/142, 146; 379/368
See application file for complete search history.

(56) References Cited

U.S. PATENT DOCUMENTS

| | | | | |
|---|---|---|---|---|
| 6,232,892 B1* | 5/2001 | Burrell, IV | ............ | 341/22 |
| 6,378,234 B1* | 4/2002 | Luo | ............ | 341/22 |
| 6,876,312 B2* | 4/2005 | Yu | ............ | 341/20 |
| 7,710,292 B2* | 5/2010 | Davies | ............ | 341/22 |

* cited by examiner

*Primary Examiner* — Albert K Wong
(74) *Attorney, Agent, or Firm* — KED & Associates, LLP (57) ABSTRACT

An apparatus and method are provided for inputting characters in electronic equipment using a limited number of keys. A key input device may include a play/pause key (hereinafter, referred to as a 'play key'), a repeat key, a record key, up/down/left/right arrow keys, and a confirm key. The key input device may generate key data corresponding to input keys. A flash memory may store a key table in which a character code, which may be a combination of certain key data, may be matched to a relevant letter. A display may display the relevant letter on a window. When key data are generated from the key input device, a central processing unit may confirm whether a combination of the generated key data is identical to a predetermined character code, based on the key table stored in the flash memory. If it is confirmed that the combination of the generated key data is identical to the predetermined character code, the CPU may control the display such that the letter corresponding to the character code is displayed on the window.

45 Claims, 11 Drawing Sheets

Korean key table

| Character code | Letter | Key symbol array |
|---|---|---|
| cd | ㄱ | → ↓ |
| dc | ㄴ | ↓ → |
| cdc | ㄷ | → ↓ → |
| cdcdc | ㄹ | → ↓ → ↓ → |
| dcdc | ㅁ | ↓ → ↓ → |
| ddcc | ㅂ | ↓ ↓ → → |
| dd | ㅅ | ↓ ↓ |
| f | ㅇ | ↑ |
| cdd | ㅈ | → ↓ ↓ |
| ccdd | ㅊ | → → ↓ ↓ |
| ccdc(cde) | ㅋ | → → ↓(→ ↓ ←) |
| cddc | ㅍ | → ↓ ↓ → |
| ccdc | ㅌ | → → ↓ → |
| ccf | ㅎ | → → ↑ |
| cdcd | ㄲ | → ↓ → ↓ |
| cdccdc | ㄸ | → ↓ → → ↓ → |
| ddccddcc | ㅃ | ↓ ↓ → → ↓ ↓ → → |
| dddd | ㅆ | ↓ ↓ ↓ ↓ |
| cddcdd | ㅉ | → ↓ ↓ → ↓ ↓ |
| de | ㅏ | ↓ ← |
| dee | ㅑ | ↓ ← ← |
| ed | ㅓ | ← ↓ |
| eed | ㅕ | ← ← ↓ |
| ec | ㅗ | ← → |
| eec | ㅛ | ← ← → |
| ce | ㅜ | → ← |
| cee | ㅠ | → ← ← |
| c | ㅡ | → |
| d | ㅣ | ↓ |
| ded | ㅐ | ↓ ← ↓ |
| edd | ㅔ | ← ↓ ↓ |
| deed | ㅒ | ↓ ← ← ↓ |
| eedd | ㅖ | ← ← ↓ ↓ |

Korean key table

| Character code | Letter | Key symbol array |
|---|---|---|
| cd | ㄱ | → ↓ |
| dc | ㄴ | ↓ → |
| cdc | ㄷ | → ↓ → |
| cda | ㄹ | → ↓ ▶ |
| dca | ㅁ | ↓ → ▶ |
| dda | ㅂ | ↓ ↓ ▶ |
| dd | ㅅ | ↓ ↓ |
| a | ㅇ | ▶ |
| cdd | ㅈ | → ↓ ↓ |
| bcdd | ㅊ | ● → ↓ ↓ |
| ccd | ㅋ | → → ↓ |
| ddc | ㅍ | ↓ ↓ → |
| ccc | ㅌ | → → → |
| cca | ㅎ | → → ▶ |
| db | ㅏ | ↓ ● |
| dbb | ㅑ | ↓ ● ● |
| bd | ㅓ | ● ↓ |
| bbd | ㅕ | ● ● ↓ |
| bc | ㅗ | ● → |
| bbc | ㅛ | ● ● → |
| cb | ㅜ | → ● |
| cbb | ㅠ | → ● ● |
| c | ㅡ | → |
| d | ㅣ | ↓ |
| dbd | ㅐ | ↓ ● ↓ |
| bdd | ㅔ | ● ↓ ↓ |
| dbba | ㅒ | ↓ ● ● ↓ |
| bbdd | ㅖ | ● ● ↓ ↓ |

FIG. 3B

English key table

| Character code | Letter | Key symbol array |
|:---:|:---:|:---:|
| ddc | A | ↓ ↓ → |
| daa | B | ↓ ▶ ▶ |
| ca | C | → ▶ |
| da | D | ↓ ▶ |
| dccc | E | ↓ → → → |
| dcc | F | ↓ → → |
| da | G | ↓ ▶ |
| dcd | H | ↓ → ↓ |
| d | I | ↓ |
| ca | J | → ▶ |
| ccd | K | → → ↓ |
| dc | L | ↓ → |
| dccd | M | ↓ → → ↓ |
| dd | N | ↓ ↓ |
| a | O | ▶ |
| ad | P | ▶ ↓ |
| ab | Q | ▶ ● |
| ac | R | ▶ → |
| aa | S | ▶ ▶ |
| cd | T | → ↓ |
| ba | U | ● ▶ |
| bd | V | ● ↓ |
| bdd | W | ● ↓ ↓ |
| cc | X | → → |
| bc | Y | ● → |
| cdc | Z | → ↓ → |

FIG. 4A

Korean key table

| Character code | Letter | Key symbol array |
|---|---|---|
| cd | ㄱ | → ↓ |
| dc | ㄴ | ↓ → |
| cdc | ㄷ | → ↓ → |
| cdcdc | ㄹ | → ↓ → ↓ → |
| dcdc | ㅁ | ↓ → ↓ → |
| ddcc | ㅂ | ↓ ↓ → → |
| dd | ㅅ | ↓ ↓ |
| f | ㅇ | ↑ |
| cdd | ㅈ | → ↓ ↓ |
| ccdd | ㅊ | → → ↓ ↓ |
| ccdc(cde) | ㅋ | → → ↓ (→ ↓ ←) |
| cddc | ㅍ | → ↓ ↓ → |
| ccdc | ㅌ | → → ↓ → |
| ccf | ㅎ | → → ↑ |
| cdcd | ㄲ | → ↓ → ↓ |
| cdccdc | ㄸ | → ↓ → → ↓ → |
| ddccddcc | ㅃ | ↓ ↓ → → ↓ ↓ → → |
| dddd | ㅆ | ↓ ↓ ↓ ↓ |
| cddcdd | ㅉ | → ↓ ↓ → ↓ ↓ |
| de | ㅏ | ↓ ← |
| dee | ㅑ | ↓ ← ← |
| ed | ㅓ | ← ↓ |
| eed | ㅕ | ← ← ↓ |
| ec | ㅗ | ← → |
| eec | ㅛ | ← ← → |
| ce | ㅜ | → ← |
| cee | ㅠ | → ← ← |
| c | ㅡ | → |
| d | ㅣ | ↓ |
| ded | ㅐ | ↓ ← ↓ |
| edd | ㅔ | ← ↓ ↓ |
| deed | ㅒ | ↓ ← ← ↓ |
| eedd | ㅖ | ← ← ↓ ↓ |

FIG. 4B

Korean key table

| Character code | Letter | Key symbol array |
|---|---|---|
| cd | ㄱ | → ↓ |
| dc | ㄴ | ↓ → |
| cdc | ㄷ | → ↓ → |
| cdcdc | ㄹ | → ↓ → ↓ → |
| dcdc | ㅁ | ↓ → ↓ → |
| ddcc | ㅂ | ↓ ↓ → → |
| dd | ㅅ | ↓ ↓ |
| f | ㅇ | ↑ |
| cdd | ㅈ | → ↓ ↓ |
| ccdd | ㅊ | → → ↓ ↓ |
| ccdc(cde) | ㅋ | → → ↓ (→ ↓ ←) |
| cddc | ㅌ | → ↓ ↓ → |
| ccdc | ㅍ | → → ↓ → |
| ccf | ㅎ | → → ↑ |
| cde | ㅗ | → ↓ ← |
| cdce | ㅛ | → ↓ → ← |
| ddcce | ㅃ | ↓ ↓ → → ← |
| dde | ㅆ | ↓ ↓ ← |
| cdde | ㅉ | → ↓ ↓ ← |
| de | ㅏ | ↓ ← |
| dee | ㅑ | ↓ ← ← |
| ed | ㅓ | ← ↓ |
| eed | ㅕ | ← ← ↓ |
| ec | ㅗ | ← → |
| eec | ㅛ | ← ← → |
| ce | ㅜ | → ← |
| cee | ㅠ | → ← ← |
| c | ㅡ | → |
| d | ㅣ | ↓ |
| ded | ㅐ | ↓ ← ↓ |
| edd | ㅔ | ← ↓ ↓ |
| deed | ㅒ | ↓ ← ← ↓ |
| eedd | ㅖ | ← ← ↓ ↓ |

FIG. 4C

Korean key table

| Character code | Letter | Key symbol array |
|---|---|---|
| cd | ㄱ | → ↓ |
| dc | ㄴ | ↓ → |
| cdc | ㄷ | → ↓ → |
| cdcdc | ㄹ | → ↓ → ↓ → |
| dcdc | ㅁ | ↓ → ↓ → |
| ddcc | ㅂ | ↓ ↓ → → |
| dd | ㅅ | ↓ ↓ |
| f | ㅇ | ↻ |
| cdd | ㅈ | → ↓ ↓ |
| ecdd | ㅊ | ← → ↓ ↓ |
| cde | ㅋ | → ↓ ← |
| ceec | ㅌ | → ← ← → |
| ccdc | ㅍ | → → ↓ → |
| ecf | ㅎ | ← → ↻ |
| cdcd | ㄲ | → ↓ → ↓ |
| cdccdc | ㄸ | → ↓ → → ↓ → |
| ddccddcc | ㅃ | ↓ ↓ → → ↓ ↓ → → |
| dddd | ㅆ | ↓ ↓ ↓ ↓ |
| cddcdd | ㅉ | → ↓ ↓ → ↓ ↓ |
| de | ㅏ | ↓ ← |
| dee | ㅑ | ↓ ← ← |
| ed | ㅓ | ← ↓ |
| eed | ㅕ | ← ← ↓ |
| ec | ㅗ | ← → |
| eec | ㅛ | ← ← → |
| ce | ㅜ | → ← |
| cee | ㅠ | → ← ← |
| c | ㅡ | → |
| d | ㅣ | ↓ |
| ded | ㅐ | ↓ ← ↓ |
| edd | ㅔ | ← ↓ ↓ |
| deed | ㅒ | ↓ ← ← ↓ |
| eedd | ㅖ | ← ← ↓ ↓ |

FIG. 4D

Korean key table

| Character code | Letter | Key symbol array |
|---|---|---|
| cd | ㄱ | → ↓ |
| dc | ㄴ | ↓ → |
| cdc | ㄷ | → ↓ → |
| cdcdc | ㄹ | → ↓ → ↓ → |
| dcdc | ㅁ | ↓ → ↓ → |
| ddcc | ㅂ | ↓ ↓ → → |
| dd | ㅅ | ↓ ↓ |
| f | ㅇ | ↑ |
| cdd | ㅈ | → ↓ ↓ |
| ecdd | ㅊ | ← → ↓ ↓ |
| cde | ㅋ | → ↓ ← |
| ceec | ㅍ | → ← ← → |
| ccdc | ㅌ | → → ↓ → |
| ecf | ㅎ | ← → ↑ |
| cde | ㄲ | → ↓ ← |
| cdce | ㄸ | → ↓ → ← |
| ddcce | ㅃ | ↓ ↓ → → ← |
| dde | ㅆ | ↓ ↓ ← |
| cdde | ㅉ | → ↓ ↓ ← |
| de | ㅏ | ↓ ← |
| dee | ㅑ | ↓ ← ← |
| ed | ㅓ | ← ↓ |
| eed | ㅕ | ← ← ↓ |
| ec | ㅗ | ← → |
| eec | ㅛ | ← ← → |
| ce | ㅜ | → ← |
| cee | ㅠ | → ← ← |
| c | ㅡ | → |
| d | ㅣ | ↓ |
| ded | ㅐ | ↓ ← ↓ |
| edd | ㅒ | ← ↓ ↓ |
| deed | ㅔ | ↓ ← ← ↓ |
| eedd | ㅖ | ← ← ↓ ↓ |

FIG. 4E

English key table

| Character code | Letter | Key symbol array |
|---|---|---|
| fdc | A | ↑ ↓ → |
| dcee | B | ↓ → ← ← |
| edc | C | ← ↓ → |
| dcde | D | ↓ → ↓ ← |
| dccc | E | ↓ → → → |
| dcc | F | ↓ → → |
| eccd | G | ← → → ↓ |
| ddc | H | ↓ ↓ → |
| d | I | ↓ |
| dc | J | ↓ ← |
| dec | K | ↓ ← → |
| dc | L | ↓ → |
| dddd | M | ↓ ↓ ↓ ↓ |
| ddd | N | ↓ ↓ ↓ |
| df | O | ↓ ↑ |
| dce | P | ↓ → ← |
| dfc | Q | ↓ ↑ → |
| dced | R | ↓ → ← ↓ |
| ece | S | ← → ← |
| cd | T | → ↓ |
| dcf | U | ↓ → ↑ |
| dd | V | ↓ ↓ |
| dfdf | W | ↓ ↑ ↓ ↑ |
| ce | X | → ← |
| dcd | Y | ↓ ← ↓ |
| cec | Z | → ← → |

APPARATUS AND METHOD FOR INPUTTING CHARACTERS IN PORTABLE ELECTRONIC EQUIPMENT

BACKGROUND

1. Field

An apparatus and method for inputting characters using keys provided on portable electronic equipment are disclosed.

2. Background of the Related Art

MP3 players, portable multimedia players (PMPs), and cellular phones included in portable electronic equipment have recently supplemented and expanded the functions of portable multimedia devices. When a user wants to, for example, search for a specific file or folder, change the name of the searched file or folder, consult an electronic dictionary, or input a text, such as characters in the portable electronic equipment, the user generally inputs relevant letters by pressing keys on a keypad corresponding one by one to the Korean alphabet (consonant and vowel) or English alphabet.

However, it is possible to use such a method only when as many keys as the number of Korean and English alphabets are provided. Therefore, the above method may be implemented in a device such as a cellular phone including ten numeric keys and two function keys on a keypad. However, the method is difficult to be applied to the portable electronic equipment, such as an MP3 player, a PMP, and a cellular phone with a reduced number of keys.

BRIEF DESCRIPTION OF THE DRAWINGS

Embodiments will be described in detail with reference to the following drawings in which like reference numerals refer to like elements wherein.

DETAILED DESCRIPTION

Hereinafter, an apparatus and method for inputting characters in portable electronic equipment will be described in detail with reference to the accompanying drawings. When describing the embodiments, detailed descriptions on components, configurations and the like well known in the art will be omitted herein.

An apparatus and method according to embodiments are described herein in conjunction with an exemplary MP3 player. One of ordinary skill in the art will recognize that the apparatus and method according to embodiments may also be utilized with other digital equipment, such as a portable media player, a PDA, a portable terminal, a navigation system, or a notebook computer. Moreover, the apparatus and method according to embodiments may be used with electronic books, newspapers, magazines, etc., different portable devices, e.g., handsets, MP3 players, notebook computers, etc., audio applications, navigation applications, televisions, monitors, or other types of devices using a display, either monochrome or color.

Figure 1:
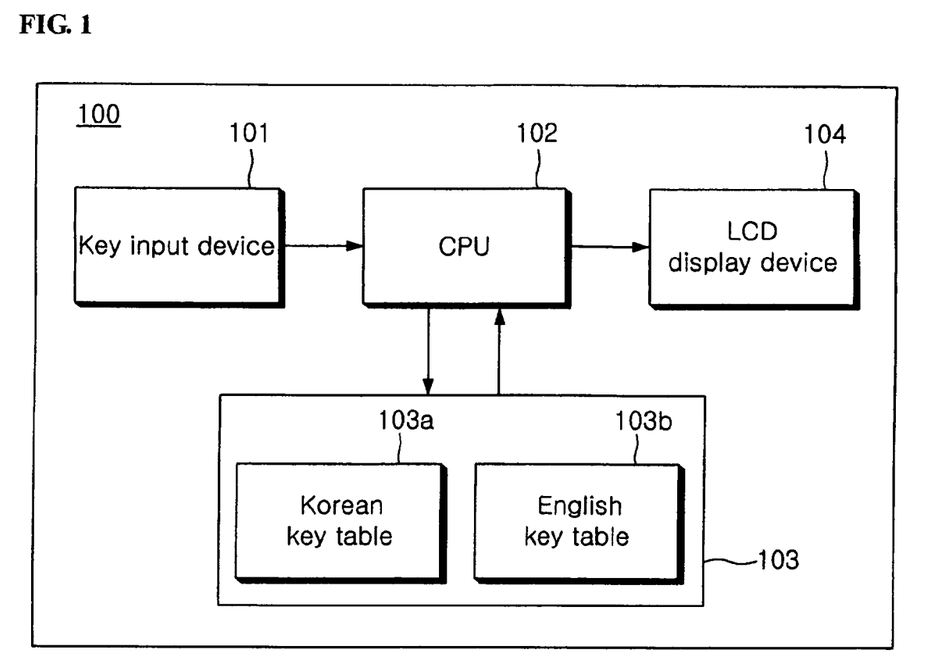
FIG. 1 is a block diagram of an exemplary MP3 player in which an apparatus and method for inputting characters according to embodiments are provided.
Figure 2:
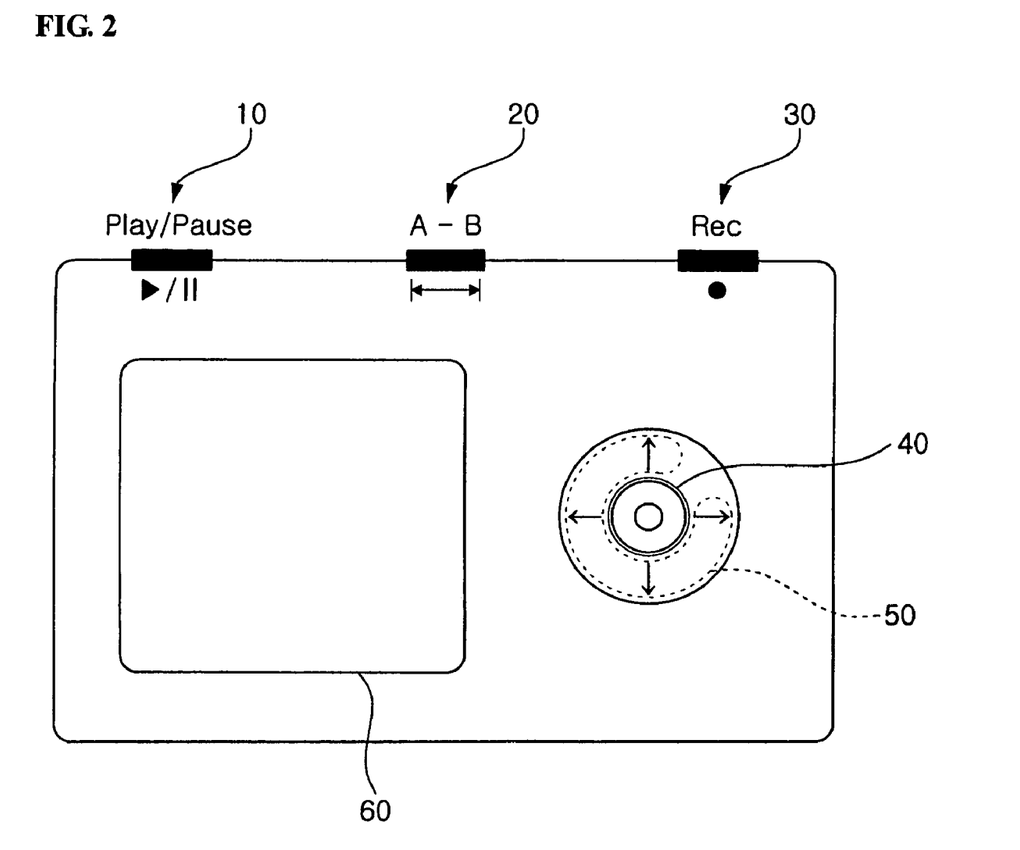
FIG. 2 shows an external appearance of the MP3 player of FIG. 1.

FIG. 1 is a block of an exemplary MP3 player in which an apparatus and method for inputting characters according to embodiments are provided. FIG. 2 shows an external appearance of the MP3 player of FIG. 1.

As shown in FIG. 2, a key input device 101 may include input keys including a play/pause key 10 (hereinafter, referred to as a 'play key'), an A-B repeat key (A-B) 20, a record key (Rec) 30, up/down/left/right arrow keys 50 and a confirm key 40, and generate key data corresponding to input keys when respectively pressed, for example, by a user. A flash memory 103 may store a key table in which a character code, which is a combination of certain key data, may be matched to a relevant letter. A display 104, which may be, for example, an LCD display, may display the relevant letters on a window 60.

When key data are generated by the key input device 101, a central processing unit (CPU) 102 may confirm whether a combination of the generated key data is identical to a predetermined character code, based on the key table stored in the flash memory 103. If it is confirmed that they are identical to each other, the CPU 102 may control the display 104 such that a specific letter corresponding to the character code may be displayed on the window 60.

In one embodiment, key data generated according to the input of the play key 10, record key 20, and right/down arrow keys 50 provided onto the key input unit 101 may be 'a', 'b', 'c' and 'd', respectively. Further, key symbols corresponding to the play key 10, record key 20, and right/down arrow keys 50 may be ▶·•, →, and ↓, respectively.

Figure 3A:
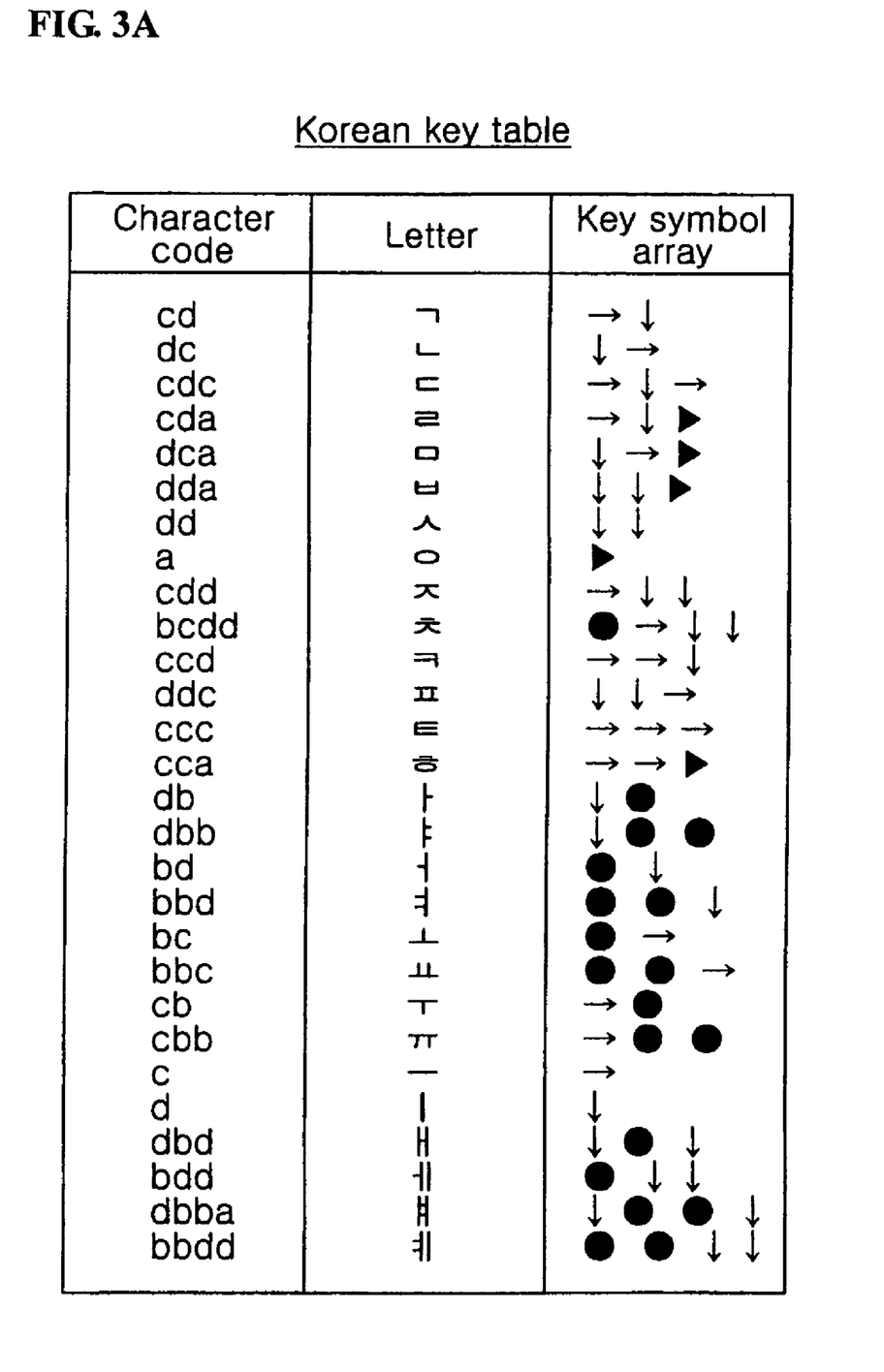
FIGS. 3A and 3B show Korean and English key tables in accordance with an embodiment.
Figure 3B:
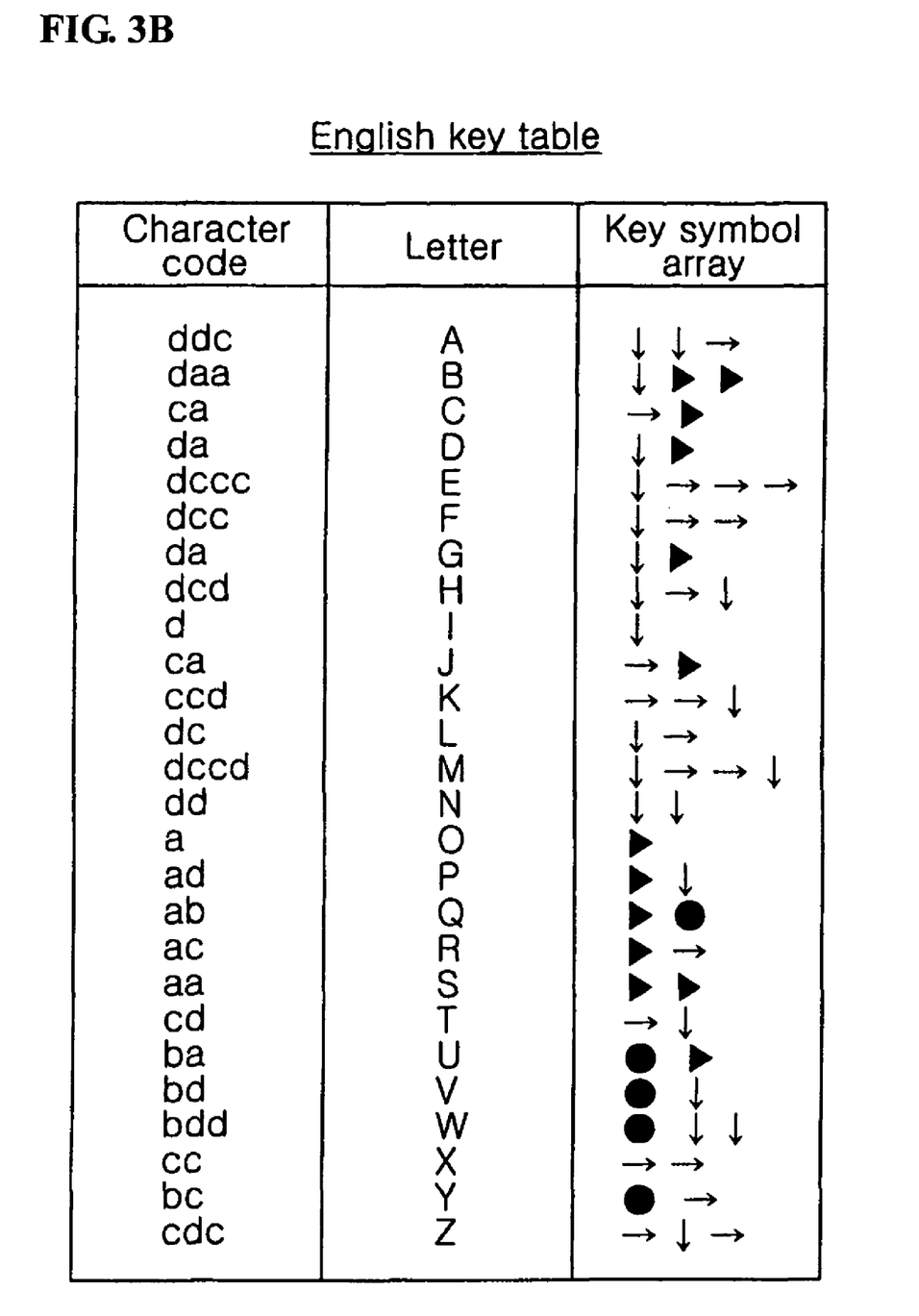

The key tables stored in the flash memory 103 will be described in detail below. As shown in FIGS. 3A and 3B, each of the key tables may be configured such that a character code, which is a combination of key data corresponding to input keys, is matched to a relevant letter. For reference, a key symbol array, which is a combination of key symbols corresponding to the input keys, is shown at the right-hand side of the key table in correspondence to a relevant letter.

That is, the reason that a character code is matched to a letter in the key table may be based on the relationship between the letter and the key symbol array. The character code may be matched to the relevant letter such that the key symbol array, which is a combination of key symbols, is based on the order of writing a relevant letter (the consonant or vowel of Korean alphabet or the English alphabet). In addition, the character code may be matched to the relevant letter such that the shapes of key symbols are based on the shape (dot or straight line) of the relevant letter (the consonant or vowel of Korean letters or the English alphabet).

For example, as shown in FIG. 3A, a letter 'ㄱ' is written in the order of writing a horizontal stroke and then writing a vertical stroke, and thus, the key symbol array, which is a combination of key symbols, corresponding to the letter 'ㄱ' becomes '→↓'. Further, since key data of the key symbols '→' and '↓' may be assigned respectively as 'c' and 'd', a character code, which is a combination of relevant key data, becomes 'cd'.

Of course, it is noted that there are some letters among the letters listed in the key table that do not completely conform to the aforementioned basis on which the character code is matched to the relevant letter. In this case, a combination of key data may be formed as simply as possible such that it is not duplicated, and the character code formed in this way may also be matched to the relevant letter.

Further, embodiments may be configured with only up, down, left and right arrow keys, and an enter key. At this time, a character code may be expressed as a letter using only the arrow keys.

Figure 4A:
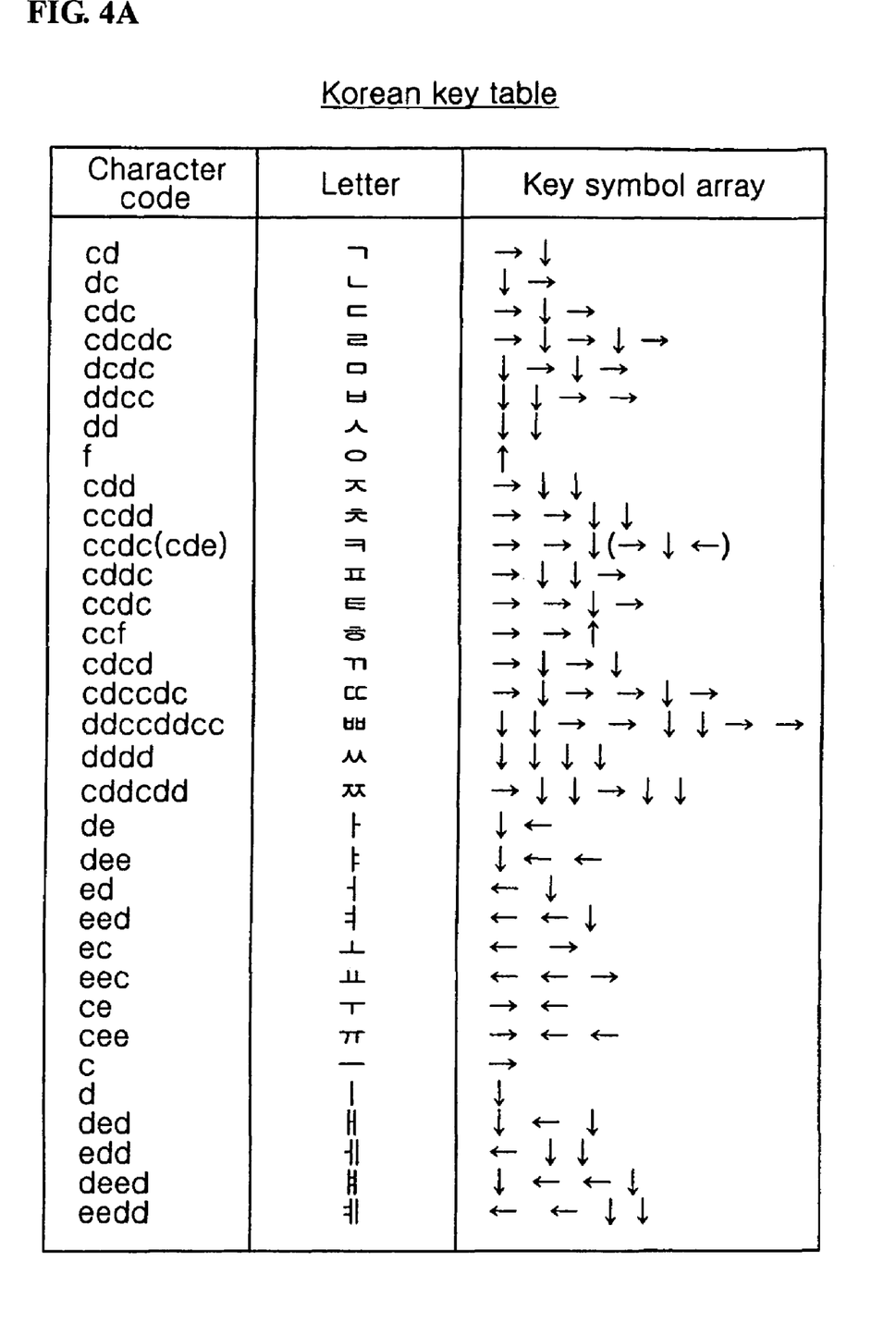
FIGS. 4A to 4E show Korean and English key tables constructed using only the up, down, left, and right arrow keys and an enter key.
Figure 4B:
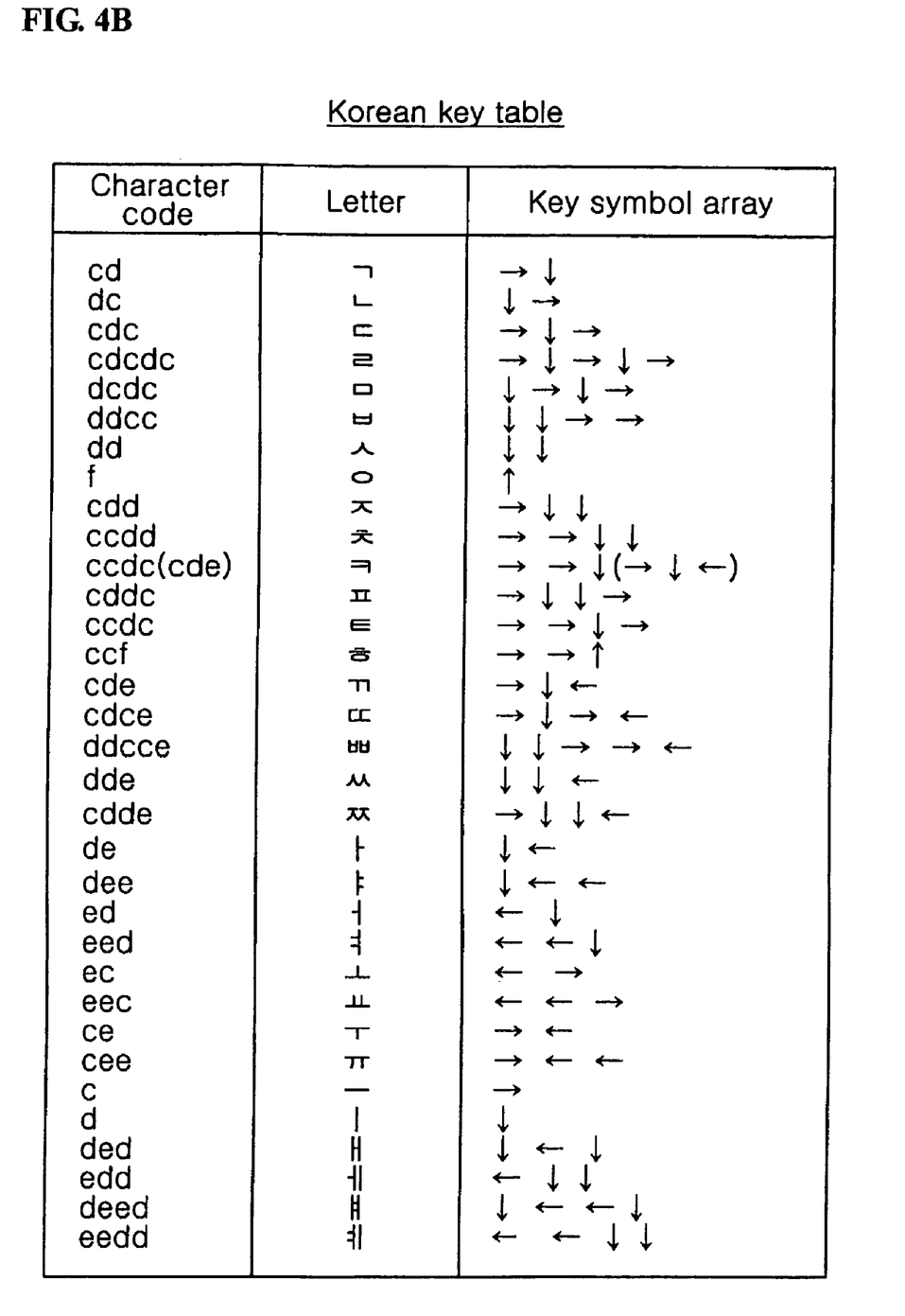
Figure 4C:
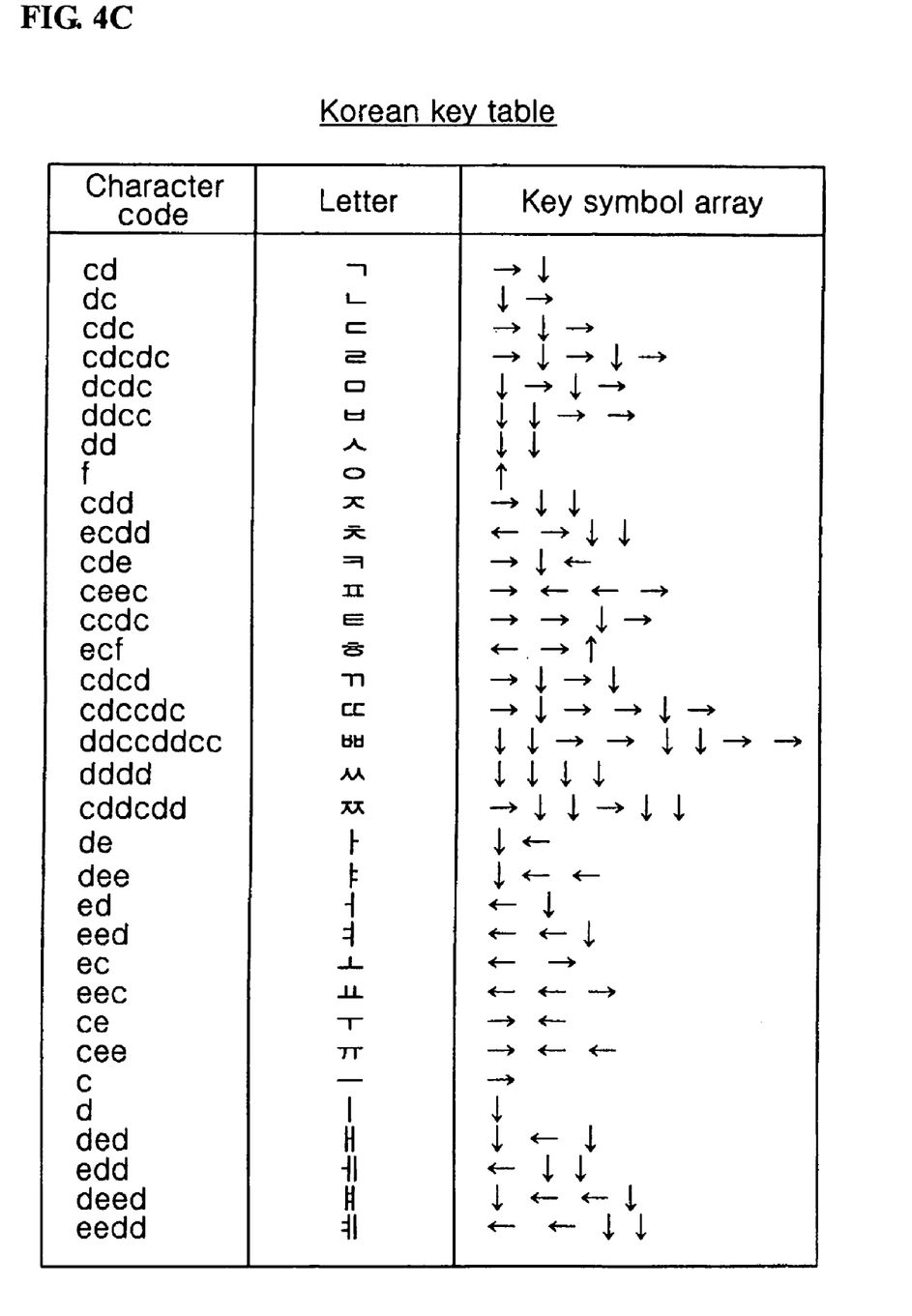
Figure 4D:
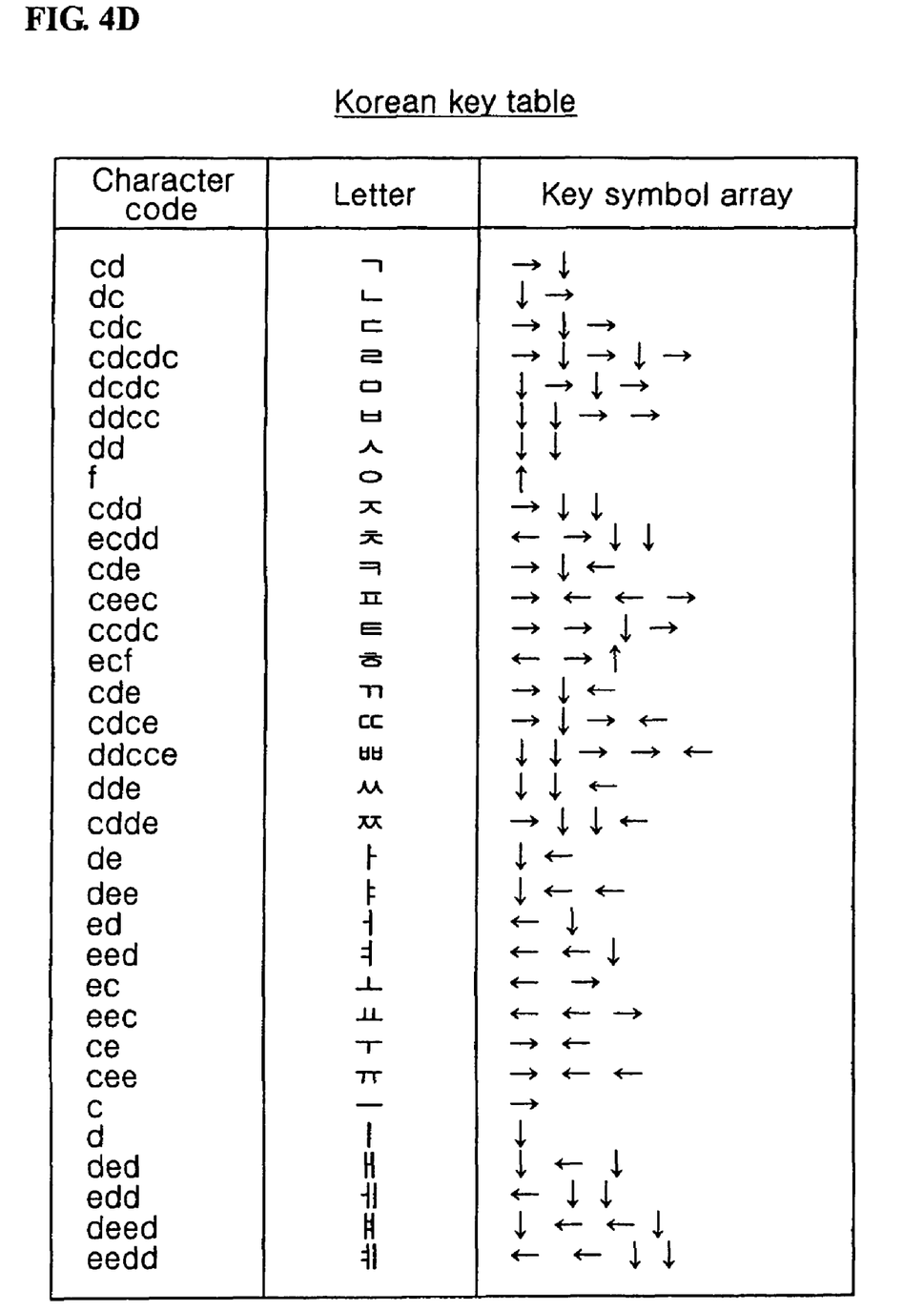
Figure 4E:
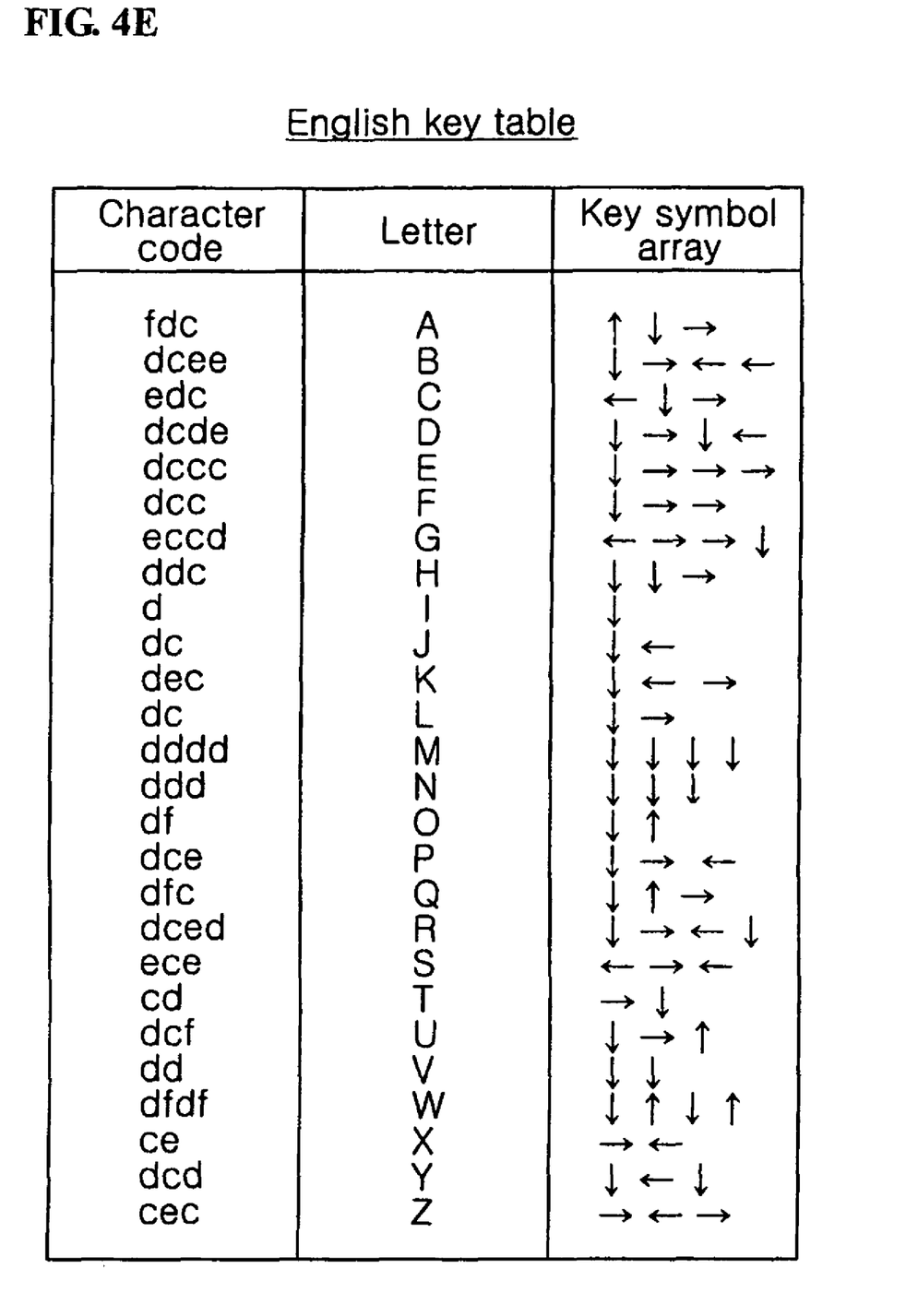

FIG. 4A shows a Korean key table in which respective letters are expressed using only the arrow keys. FIG. 4B shows a Korean key table in which the input of double consonants may be simply made in comparison to the key table of FIG. 4A. FIG. 4C shows a Korean key table in which the input of consonants containing dots may be simply made. FIG. 4D shows a Korean key table in which the input of consonants containing the double consonants and a dot may be simply made. Further, FIG. 4E shows an English key table in which respective letters may be expressed using only the arrow keys.

First, as shown in FIG. 4A, it is assumed that key data corresponding to the up arrow key '↑' is 'f', key data corresponding to the down arrow key '↓' is 'd', key data corresponding to the left arrow key '←' is 'e', and key data corresponding to the right arrow key '→' is 'c'. In one embodiment, the principle of combining character codes may be based on the order and direction of writing a letter. That is, a key corresponding to a straight line written from left to right may be a right arrow key '→', and a key corresponding to a straight line written from top to bottom may be a down arrow key '↓'. However, in the case of the Korean alphabet, no strokes written from right to left and from bottom to top exist. Thus, the left and up arrow keys may be used to express other things. In one embodiment, the left arrow key may be used as a key for expressing a dot when expressing vowels. In addition, the up arrow key may be used to express a consonant of Eeung 'ㅇ'. In this embodiment, the order of writing a letter may conform to the rules prescribed in the Korean textbook.

A key table constructed in accordance with the foregoing principle is shown in FIG. 4A. Each character code should not be duplicated. However, according to the foregoing principle, it may be understood that the character codes corresponding to consonants 'ㄷ'and 'ㄱ'are duplicated as 'cdc' (→↓→). Therefore, in FIG. 4A, the order of writing 'ㄱ'is defined in a different way from that in the Korean textbook. That is, as shown in the FIG. 4A, it is defined as 'ccd' (→→↓) or 'cde' (→↓→). In such a case, the order of writing a letter 'ㄱ'may be understood in a different way or the last stroke may be understood as a dot.

Further, letters may be more simply input by utilizing the left arrow key in various ways. That is, as shown in FIG. 4B, if a single consonant is first input and a left arrow key is then added when expressing a double consonant, it may be recognized as a double consonant. Thus, a double consonant may be input by inputting a consonant 'ㄱ','ㄷ','ㅂ','ㅅ'or 'ㅈ'corresponding to a double consonant 'ㄲ','ㄸ','ㅃ','ㅆ'or 'ㅉ'and then adding the left arrow key '←' to the input single consonant. Since the left arrow key is not used for a consonant as a rule, a user would not be confused even though such a special function is added.

In addition, FIG. 4C shows a key table in which the range of combining a character code is extended using the left arrow key for consonants containing dots to thereby simplify the input of letters. That is, the key table means that when a consonant 'ㅊ','ㅋ','ㅍ'or 'ㅎ'containing a dot is input, the dot may be input in the form of the left arrow key. Such a method extends the range of selecting a character code to thereby eliminate the confusion between 'ㄷ'and 'ㄱ'as described above.

The key tables shown in FIGS. 4B and 4C may be combined into the key table shown in FIG. 4D.

FIG. 4E shows a key table for the input of the English alphabet. According to a principle of combining a character code, a key corresponding to a straight line written from left to right may be a right arrow key '→', a key corresponding to a straight line written from right to left may be a left arrow key '←', a key corresponding to a straight line written from top to bottom may be a down arrow key '↓', and a key corresponding to a straight line written from bottom to top may be an up arrow key '↑'. Here, the letters are capital letters. The reason is that since a small letter is more curved than the capital letter, there are more limitations in expressing each shape of the small letter using only the arrow keys.

In addition, a method of sequentially inputting the up arrow key '↑', the right arrow key '→', the down arrow key '↓' and the left arrow key '←' may be selected for inputting a character code representing a circle. To simplify the input process, however, a method of sequentially inputting the down arrow key '↓' and the up arrow key '↑' may be adopted.

Then, a method of sequentially inputting the right arrow key '→' and the left arrow key '←' may be employed to input a shape 'ⅅ'.However, in order to distinguish 'D' from 'P', a method of sequentially inputting the right arrow key '→', the down arrow key '↓' and the left arrow key '←' may be employed for the character code corresponding to 'D'.

The aforementioned configuration is merely for the input of letters. Functional blocks for processing multimedia files and data signals that are not directed to the spirit of the invention are not illustrated herein.

Figure 5:
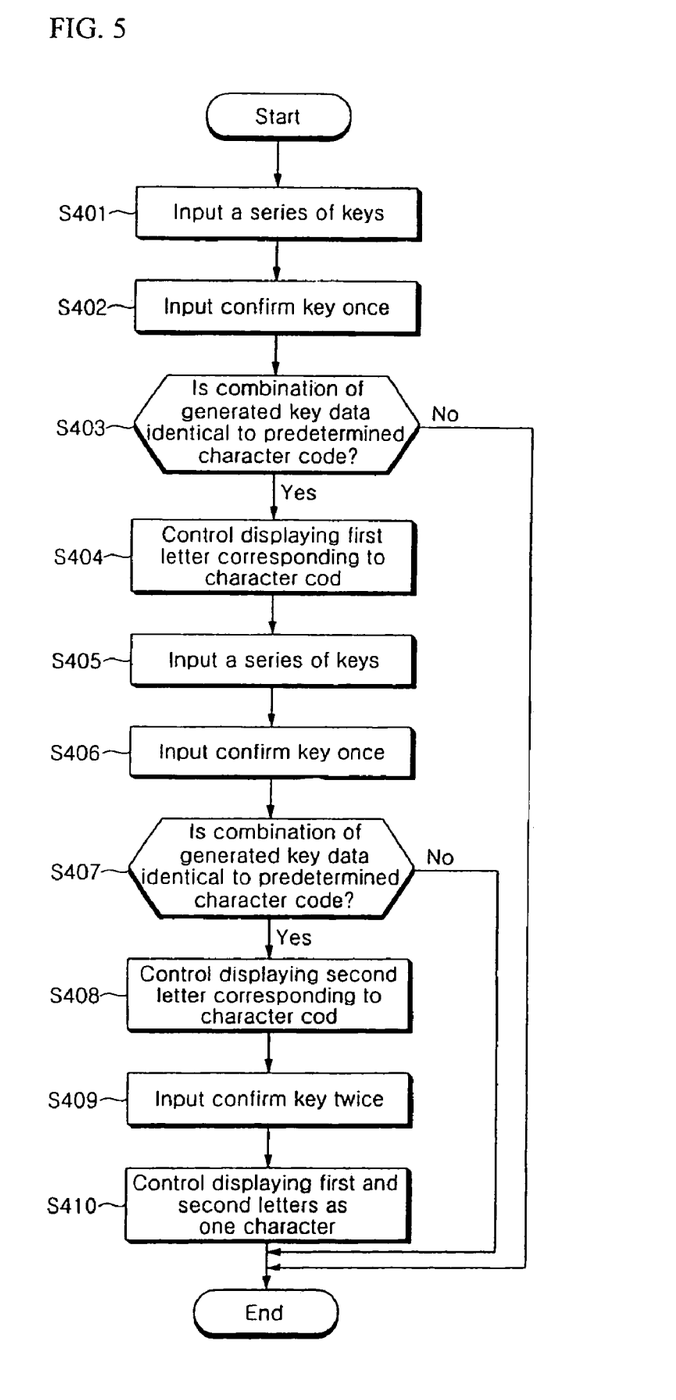
FIG. 5 is a flowchart illustrating a method of inputting the Korean alphabet in a portable electronic equipment according to an embodiment.

FIG. 5 is a flowchart illustrating a method of inputting characters in a portable electronic equipment according to an embodiment of the invention. Hereinafter, the operation of the apparatus for inputting characters in a portable electronic equipment so configured will be described in detail with reference to FIG. 5.

First, if a series of keys are input and a confirm key is then input once through the key input 101, in steps S401 and S402, the CPU 102 may confirm whether a combination of the key data, which may be generated by a series of the keys input before the confirm key is input, is identical to a predetermined character code, step S403. That is, the CPU 102 may confirm whether a combination of key data corresponds to a character code in the key tables shown in FIGS. 3A and 3B. At this time, in a method of inputting characters using only arrow keys, the CPU may confirm whether a combination of key data is identical to a character code in any one of the key tables shown in FIGS. 4A to 4E. If it is confirmed that the combination of key data is identical to the character code in the key table, 'Yes' in step S403, the CPU 102 may control the display 104, such that a first letter (arbitrarily assigned to be distinguished from a second letter that will be described later) corresponding to the character code may be displayed on the window 60.

Next, if a series of keys are input again and the confirm key is then input once through the key input device 101, in steps S405 and S406, the CPU 102 may confirm, in the same manner as described above, whether a combination of the key data, which has been input before the confirm key is input, is identical to a predetermined character code, in step S407.

If so, 'Yes' in step S407, the CPU may control the display 104 such that a second letter corresponding to the character code is displayed on the window 60. Then, if the confirm key is consecutively input twice through the key input device 101, in step S409, the CPU 102 may control the display 104 such that the first and second letters are displayed as a single character, in step S410. For example, in a case where the first letter is 'ㄱ'and the second letter is 'ㅗ',the single character expressed in step S410 may correspond to 'ㅛ'.

Although only a method of inputting the Korean alphabet is described above, a method of inputting the English alphabet may be implemented in the same way as the method of inputting the Korean alphabet. Further, since each letter becomes a single character in the English alphabet, in contrast to the Korean alphabet, steps S409 and S410 may be omitted.

An LCD display may be described as an example of a display in the aforementioned embodiment. However, a variety of display devices, including but not limited to a liquid crystal display (LCD), a plasma display panel (PDP), a light emitting diode (LED), or an organic light emitting diode (OLED), and any next generation display devices may also be employed.

Embodiments relate to an apparatus and method capable of inputting characters without a large number of keys. Thus, embodiments may be applied to small-sized devices. For example, embodiments may be applied to small digital equipment using a hologram without a display window.

Further, embodiments may also be used in a method of searching for data.

Figure 6:
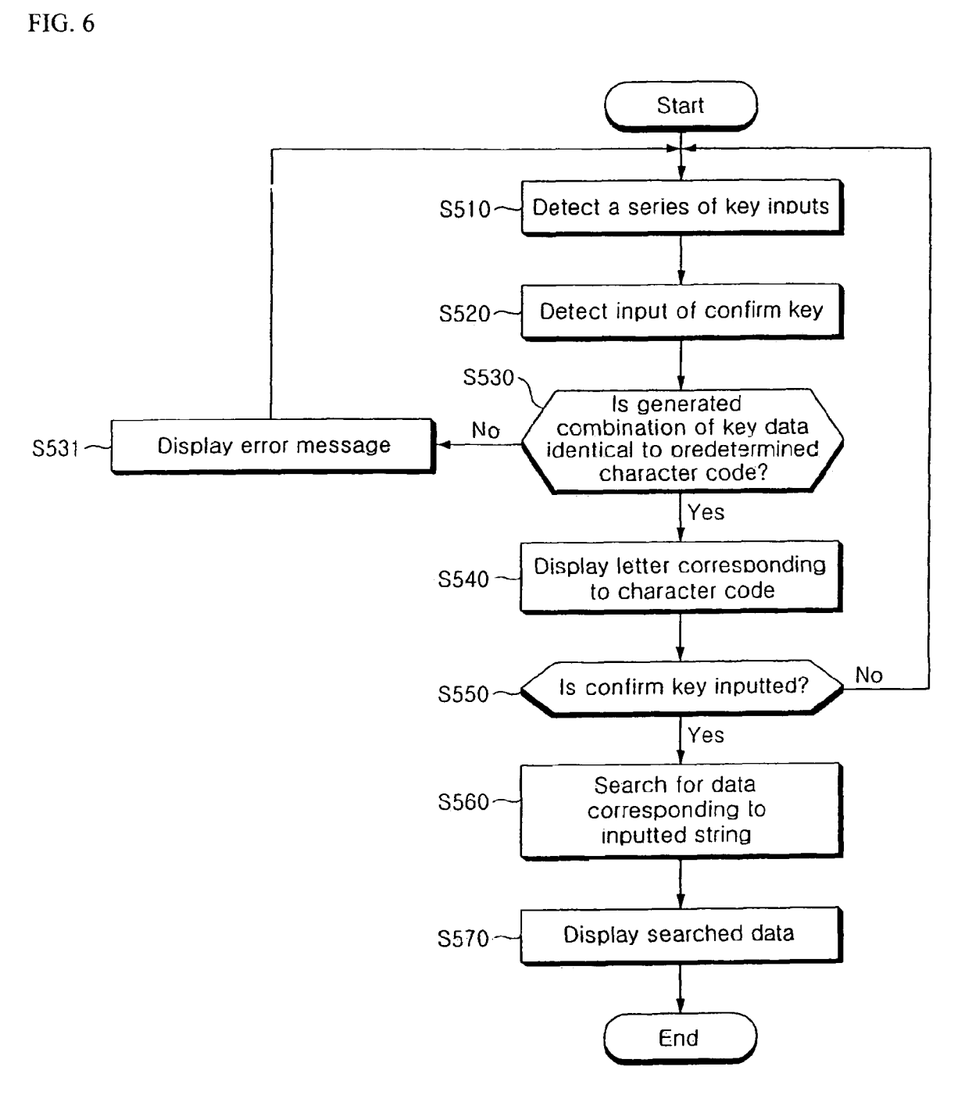
FIG. 6 is a flowchart illustrating a method of searching for data in a portable electronic equipment according to an embodiment.

FIG. 6 is a flowchart illustrating a method of searching for data in a portable electronic equipment according to an embodiment. As shown in FIG. 6, in order to search for data according to this embodiment, letters input in the aforementioned method may first be recognized. That is, input arrow keys may be detected to generate key data corresponding to the input arrow keys, in step S510. If a confirm button is input, in step S520, it is confirmed whether a combination of the generated key data corresponds to a predetermined character code, in step S530, and a letter corresponding to the character code extracted and displayed, in step S540. If there is no character code corresponding to the combination of the key data, an error message (for example, 'There is no relevant letter') may be displayed and the portable electronic equipment may wait for a new input, in step S531. Here, the principle of inputting respective letters and the method of comparing the combination of key data with a predetermined character code may be the same as those described above.

Next, the letters may be repeatedly recognized and one or more strings may then be created. The string may be, for example, a complete character, word, or sentence, and it may be a set of initial consonants in the case of the Korean alphabet. Also, in the case of the English alphabet, the string may be a set of initial letters of respective words.

Next, the input of a confirm button by a user may be detected, in step S550. That is, this may be to confirm that the user has completed inputting letters and to proceed to the step of searching data. At this time, the confirm button may be provided as an additional button, but the confirm button for confirming the input of letters may be used. The confirm button may be utilized in such a manner that it is recognized as an input of a letter when the confirm button is pressed one time and it may be recognized as an input of a string when the confirm button is pressed once without a new key input after the input of letters.

Next, if the confirm button is input, data corresponding to the string may be searched, in step S560. At this time, a data name may become the name of a variety of data, such as a music title, a name of singer, an album title, a name of address book, an image name, or a video name, according to data for which the user wishes to search. Finally, the names of the searched materials or the data corresponding thereto may be displayed, in step S570.

According to embodiments so configured, since respective letters are input using a limited number of keys, embodiments may be applied to a portable electronic equipment having a small number of keys. Further, since a combination of key symbols corresponding to input keys may be based on the order of writing a letter, a key operating environment may be improved such that a key symbol array for each letter may be easily understood.

Further, since the shapes of the key symbols corresponding to the keys input for displaying a letter may be set to be based on the shape of a letter (a dot or straight line), a key operating environment may be further improved such that a key symbol array for each letter may be easily understood. Therefore, respective letters may be further easily input. Moreover, since respective letters may be more easily input through keys, the letters may be more rapidly input.

Embodiments broadly disclosed herein provide an apparatus and method for inputting characters in portable electronic equipment using a limited number of keys. Further, embodiments provide an apparatus and method for inputting characters in portable electronic equipment, wherein a combination of key symbols corresponding to input keys may be based on the order of writing a specific letter. Furthermore, embodiments provide an apparatus and method for inputting characters in portable electronic equipment, wherein the shapes of the key symbols corresponding to input keys may be based on the shape (dot or straight line) of a specific letter. Additionally, embodiments provide an apparatus and method for inputting characters in portable electronic equipment, wherein the characters may be more easily input through keys.

According to one embodiment, there is provided an apparatus for inputting characters in portable electronic equipment, comprising a key input unit for generating key data corresponding to input keys, a display unit for displaying letters or characters thereon, a storage unit for storing character codes corresponding to a combination of predetermined key data and relevant letters corresponding o the character codes, and a control unit for causing, when a combination of the generated key data is identical to a predetermined character code, a letter corresponding to the character code to be displayed on the display unit, wherein the combination of key symbols corresponding to the input keys is based on an order of writing the displayed letter. The keys may be a play key, a record key and right/down arrow keys, and the key symbols corresponding to the play key, the record key and the right/down arrow keys may be '▶','•' and '→'/'↓', respectively. Shapes of the key symbols corresponding to the input keys may be based on a shape of the displayed letter. Further, the shape of the letter may be a dot or a straight line, and the letter may be a Korean consonant or vowel, or a letter of English alphabet.

According to another embodiment, there is provided an apparatus for inputting characters in portable electronic equipment, comprising a key input unit for generating key data corresponding to input keys, a display unit for displaying letters or characters thereon, a storage unit for storing character codes corresponding to a combination of predetermined key data and relevant letters corresponding to the character codes, and a control unit for causing, when a combination of the generated key data is identical to a predetermined character code, a letter corresponding to the character code to be displayed on the display unit, wherein the keys are up, down, left and right arrow keys ('↑', '↓', '←', '→'). The character code may include a combination of the keys corresponding to an order and direction of writing the letter. Further, the character code may include a combination of the keys corresponding to a shape of the letter and a direction of writing the letter. Additionally, the character code may include a combination of the keys corresponding to at least one or more of a shape of the letter, an order of writing the letter, and a direction of writing the letter.

The shape of the letter may be a dot, a straight line, or a dot and straight line. Further, the letter may be a Korean consonant or vowel.

Furthermore, a key corresponding to a straight line of the letter written from left to right may be the right arrow key '→', a key corresponding to a straight line of the letter written from top to bottom may be the down arrow key '↓', a key corresponding to a final consonant of Eeung 'ㅇ' may be the up arrow key '↑' and a key corresponding to a dot in a vowel may be the left arrow key '←'. In addition, a key corresponding to one or more double consonants among letters 'ㄲ','ㄸ','ㅃ','ㅆ'and 'ㅉ'may be created by adding the left arrow key '←' to a key corresponding to a final consonant of 'ㄱ','ㄷ','ㅂ','ㅅ'or 'ㅈ' The consonants containing the dot may be 'ㅊ','ㅋ','ㅍ'and 'ㅎ'.The letter may be a letter of English alphabet. The letter of English alphabet may be a capital letter.

According to a further embodiment, there is provided a method of inputting characters in portable electronic equipment, comprising generating key data corresponding to input keys, confirming whether a combination of the generated key data is identical to a predetermined character code, and displaying a letter corresponding to the character code when it is confirmed that the combination of the generated key data is identical to the predetermined character code, wherein the combination of key symbols corresponding to the input keys is based on an order of writing the displayed letter. The keys may be a play key, a record key, and right/down arrow keys, and the key symbols corresponding to the play key, the record key, and the right/down arrow keys may be '▶','●' and '→'/'↓', respectively. Shapes of the key symbols corresponding to the input keys may be based on a shape of the displayed letter. The shape of the letter may be a dot or a straight line. The letter may be a Korean consonant or vowel. Also, the letter may be a letter of English alphabet.

According to a still further embodiment, there is provided a method of inputting characters in portable electronic equipment, comprising generating key data corresponding to input direction keys, detecting an input of a confirm key, confirming whether a combination of the generated key data is identical to a predetermined character code if the confirm key is input, and displaying a letter corresponding to the character code if it is confirmed that the combination of the generated key data is identical to the predetermined character code. The character code may be a combination of the keys corresponding to an order and direction of writing the letter, a combination of the keys corresponding to a shape of the letter and a direction of writing the letter, or a combination of the keys corresponding to at least one or more of a shape of the letter, an order of writing the letter, and a direction of writing the letter. Further, the shape of the letter may be a dot, a straight line, or a dot and straight line. Also, the letter may be a Korean consonant or vowel.

A key corresponding to a straight line of the letter written from left to right may be the right arrow key '→', a key corresponding to a straight line of the letter written from top to bottom may be the down arrow key '↓', a key corresponding to a final consonant of Eeung 'ㅇ' may be the up arrow key '↑' and a key corresponding to a dot in a vowel may be the left arrow key '←'. Further, a key corresponding to one or more double consonants among letters 'ㄲ','ㄸ','ㅃ','ㅆ'and 'ㅉ'may be created by adding the left arrow key '←' to a key corresponding to a final consonant of 'ㄱ','ㄷ','ㅂ','ㅅ'or 'ㅈ'

Additionally, a key corresponding to a dot in a consonant may be the left arrow key '→'. The consonants containing the dot may be 'ㅊ','ㅋ','ㅍ'and 'ㅎ'.Also, the letter may be a letter of English alphabet. The letter of English alphabet may be a capital letter.

The method may further comprise selecting either a capital letter input mode or a small letter input mode, wherein a small letter corresponding to the character code may be displayed in the case of the small letter input mode.

Preferably, a key corresponding to a straight line of the letter written from left to right may be the right arrow key '→', a key corresponding to a straight line of the letter written from right to left may be the left arrow key '←', a key corresponding to a straight line of the letter written from top to bottom may be the down arrow key '↓' and a key corresponding to a straight line of the letter written from bottom to top may be the up arrow key '↑'.

According to a still further embodiment, there is provided a method of searching for data in portable electronic equipment, comprising the steps of (a) generating key data corresponding to input direction keys, confirming whether a combination of the generated key data is identical to a predetermined character code if a confirm button is input, and extracting and displaying a letter corresponding to the character code, (b) creating one or more strings by repeating step (a), (c) detecting an input of the confirm button by a user, (d) extracting a data name corresponding to the string if the confirm button is input, and (e) displaying the extracted data name or data corresponding to the extracted data name. The character code may be a combination of the keys corresponding to at least one or more of a shape of the letter, an order of writing the letter, and a direction of writing the letter.

Further, a key corresponding to a straight line of the letter written from left to right may be the right arrow key '→', a key corresponding to a straight line of the letter written from top to bottom may be the down arrow key '↓', a key corresponding to a final consonant of Eeung 'ㅇ' may be the up arrow key '↑', and a key corresponding to a dot in a vowel may be the left arrow key '←'.

The string in step (b) may be a combination of initial consonants in the case of Korean alphabet. Alternatively, the string in step (b) may be a combination of initial letters of words in the case of English alphabet. Further, the data in steps (d) and (e) may be music, a singer, an album, an address book, an image, or a video.

As discussed above, the apparatus and method for inputting characters according to embodiments are configured in such a manner that a limited number of keys may be used, a combination of key symbols corresponding to input keys may be based on the order of writing a letter, and the shapes of the key symbols corresponding to the input keys may be based on the shape of a letter (dot or straight line), whereby a user may more further easily input the characters using the keys.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the disclosure. In addition to variations and modifications in the component parts and/or arrangements, alternative uses will also be apparent to those skilled in the art.

What is claimed is:

1. An apparatus for inputting characters in electronic equipment, comprising:
   input direction keys configured to generate key data corresponding to an order of writing a letter or to a direction of writing the letter;
   a confirm key;
   a display configured to display letters or characters thereon;
   a storage device configured to store character codes corresponding to a combination of predetermined key data and relevant letters corresponding to the character codes; and
   a controller configured to cause, when a combination of the generated key data using the input direction keys and the confirm key is identical to a predetermined character code, a letter corresponding to the character code to be displayed on the display, wherein the input direction keys are up, down, and left and right arrow keys ('↑', '↓', '←', '→').

2. The apparatus as claimed in claim 1, wherein the character code comprises a combination of the input direction keys corresponding to at least one or more of a shape of the letter, the order of writing the letter, and the direction of writing the letter.

3. The apparatus as claimed in claim 2, wherein the shape of the letter is a dot and/or a straight line.

4. The apparatus as claimed in claim 1, wherein the letter is a Korean consonant or vowel.

5. The apparatus as claimed in claim 4, wherein a key corresponding to a straight line of the letter written from left to right is the right arrow key '→', a key corresponding to a straight line of the letter written from top to bottom is the down arrow key '↓', a key corresponding to a final consonant of Eeung 'ㅇ' is the up arrow key '↑' and a key corresponding to a dot in a vowel is the left arrow key '←'.

6. The apparatus as claimed in claim 5, wherein a key corresponding to one or more double consonants among letters 'ㄲ','ㄸ','ㅃ','ㅆ' and 'ㅉ' is created by adding the left arrow key '←' to a key corresponding to a final consonant of 'ㄱ','ㄷ','ㅂ','ㅅ' or 'ㅈ'.

7. The apparatus as claimed in claim 4, wherein a key corresponding to a dot in a consonant is the left arrow key '←'.

8. The apparatus as claimed in claim 7, wherein the consonants containing the dot are 'ㅊ','ㅋ','ㅍ' and 'ㅎ'.

9. The apparatus as claimed in claim 1, wherein the letter is a letter of the English alphabet.

10. The apparatus as claimed in claim 9, wherein the letter of the English alphabet is a capital letter.

11. The apparatus as claimed in claim 9, wherein a key corresponding to a straight line of the letter written from left to right is the right arrow key '→', a key corresponding to a straight line of the letter written from right to left is the left arrow key '←', a key corresponding to a straight line of the letter written from top to bottom is the down arrow key '↓' and a key corresponding to a straight line of the letter written from bottom to top is the up arrow key '↑'.

12. The apparatus as claimed in claim 1, wherein the electronic equipment comprises portable electronic equipment.

13. The apparatus as claimed in claim 12, wherein the portable electronic equipment comprises one of a portable media player, a PDA, a portable terminal, a navigation system, or a notebook computer.

14. A method of inputting characters in electronic equipment, comprising:
   generating key data corresponding to an order of writing a letter or to a direction of writing the letter using input direction keys, wherein the input direction keys include an up arrow key, a down arrow key, a left arrow key and a right arrow key;
   detecting an input of a confirm key;
   confirming whether a combination of the generated key data based on the input direction keys is identical to a predetermined character code when the confirm key is input; and
   displaying a letter corresponding to the character code when it is confirmed that the combination of the generated key data is identical to the predetermined character code.

15. The method as claimed in claim 14, wherein the character code comprises a combination of the input direction keys corresponding to at least one or more of a shape of the letter, the order of writing the letter, and the direction of writing the letter.

16. The method as claimed in claim 15, wherein the shape of the letter is a dot and/or a straight line.

17. The method as claimed in claim 14, wherein the letter is a Korean consonant or vowel.

18. The method as claimed in claim 17, wherein a key corresponding to a straight line of the letter written from left to right is the right arrow key '→', a key corresponding to a straight line of the letter written from top to bottom is the down arrow key '↓', a key corresponding to a final consonant of Eeung 'ㅇ' is the up arrow key '↑' and a key corresponding to a dot in a vowel is the left arrow key '←'.

19. The method as claimed in claim 18, wherein a key corresponding to one or more double consonants among letters 'ㄲ','ㄸ','ㅃ','ㅆ' and 'ㅉ' is created by adding the left arrow key '←' to a key corresponding to a final consonant of 'ㄱ','ㄷ','ㅂ','ㅅ' or 'ㅈ'.

20. The method as claimed in claim 17, wherein a key corresponding to a dot in a consonant is the left arrow key '←'.

21. The method as claimed in claim 20, wherein the consonants containing the dot are 'ㅊ','ㅋ','ㅍ' and 'ㅎ'.

22. The method as claimed in claim 14, wherein the letter is a letter of the English alphabet.

23. The method as claimed in claim 22, wherein the letter of English alphabet is a capital letter.

24. The method as claimed in claim 22, wherein a key corresponding to a straight line of the letter written from left to right is the right arrow key '→', a key corresponding to a straight line of the letter written from right to left is the left arrow key '←', a key corresponding to a straight line of the letter written from top to bottom is the down arrow key '↓' and a key corresponding to a straight line of the letter written from bottom to top is the up arrow key '↑'.

25. The method as claimed in claim 22, further comprising:
   selecting either a capital letter input mode or a small letter input mode, wherein a small letter corresponding to the character code is displayed in the case of the small letter input mode.

26. A method of operating portable electronic equipment, comprising the method of claim 14.

27. The method as claimed in claim 26, wherein the portable electronic equipment comprises one of a portable media player, a PDA, a portable terminal, a navigation system, or a notebook computer.

28. A method of searching for data in electronic equipment, comprising:
generating key data corresponding to an order of writing a letter using input direction keys or to a direction of writing the letter using the input direction keys, confirming whether a combination of the generated key data based on the input direction keys is identical to a predetermined character code when a confirm button is input after input using the input direction keys, and extracting and displaying a letter corresponding to the character code;
creating one or more strings by repeating the generating the key data;
detecting an input of the confirm button;
extracting a data name corresponding to the string when the confirm button is input; and
displaying the extracted data name or data corresponding to the extracted data name, wherein the input direction keys include an up arrow key, a down arrow key, a left arrow key and a right arrow key.

29. The method as claimed in claim 28, wherein the character code comprises a combination of the input direction keys corresponding to at least one or more of a shape of the letter, the order of writing the letter, and the direction of writing the letter.

30. The method as claimed in claim 29, wherein a key corresponding to a straight line of the letter written from left to right is the right arrow key '→', a key corresponding to a straight line of the letter written from top to bottom is the down arrow key '↓', a key corresponding to a final consonant of Eeung 'O' is the up arrow key '↑', and a key corresponding to a dot in a vowel is the left arrow key '←'.

31. The method as claimed in claim 29, wherein a key corresponding to a straight line of the letter written from left to right is the right arrow key '→', a key corresponding to a straight line of the letter written from right to left is the left arrow key '←', a key corresponding to a straight line of the letter written from top to bottom is the down arrow key '↓' and a key corresponding to a straight line of the letter written from bottom to top is the up arrow key '↑'.

32. The method as claimed in claim 28, wherein the string in the creating the one or more strings is a combination of initial consonants in the Korean alphabet.

33. The method as claimed in claim 28, wherein the string in the creating the one or more strings is a combination of initial letters of words in the English alphabet.

34. The method as claimed in claim 28, wherein the data in the extracting and the displaying are music, singer, album, address book, image, or video.

35. A method of operating portable electronic equipment, comprising the method of claim 28.

36. The method as claimed in claim 35, wherein the portable electronic equipment comprises one of a portable media player, a FDA, a portable terminal, a navigation system, or a notebook computer.

37. The apparatus as claimed in claim 1, wherein the key data is generated corresponding to the direction of writing the letter using only the input direction keys.

38. The apparatus as claimed in claim 1, wherein the key data is generated corresponding the order of writing the letter using only the input direction keys.

39. The apparatus as claimed in claim 38, wherein the order of writing the letter utilizes at least two of the input direction keys.

40. The method as claimed in claim 14, wherein the key data is generated corresponding to the direction of writing the letter using only the input direction keys.

41. The method as claimed in claim 14, wherein the key data is generated corresponding the order of writing the letter using only the input direction keys.

42. The method as claimed in claim 41, wherein the order of writing the letter utilizes at least two of the input direction keys.

43. The method as claimed in claim 28, wherein the key data is generated corresponding to the direction of writing the letter using only the input direction keys.

44. The method as claimed in claim 28, wherein the key data is generated corresponding the order of writing the letter using only the input direction keys.

45. The method as claimed in claim 44, wherein the order of writing the letter utilizes at least two of the input direction keys.

* * * * *